BRYSON & HARTSUFF.
Curb for Water Wheels.
No. 81,474.
2 Sheets—Sheet 1.
Patented Aug. 25, 1868.
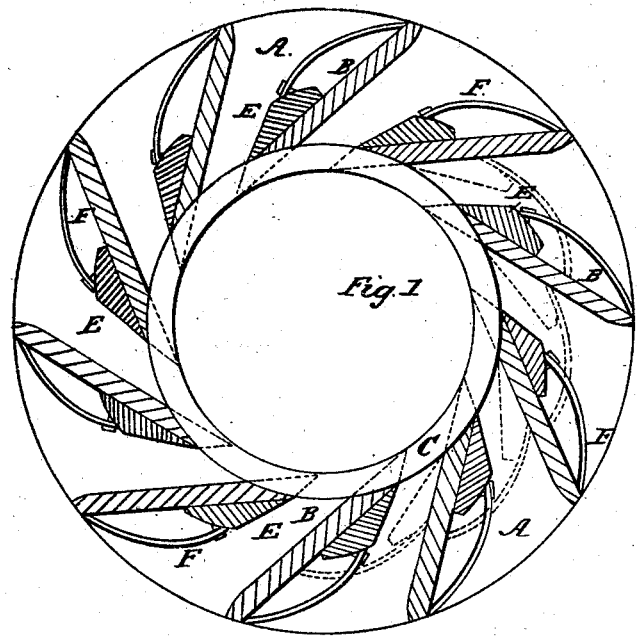
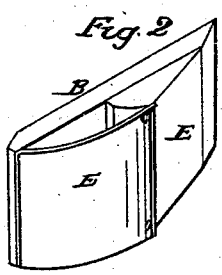
WITNESSES
Leopold Evert
John N. Stoofs
INVENTORS
J. D. Bryson
J. H. Hartsuff
per Alexander & Mason
Attys BRYSON & HARTSUFF.
Curb for Water Wheels.
No. 81,474.
2 Sheets—Sheet 2.
Patented Aug. 25, 1868.
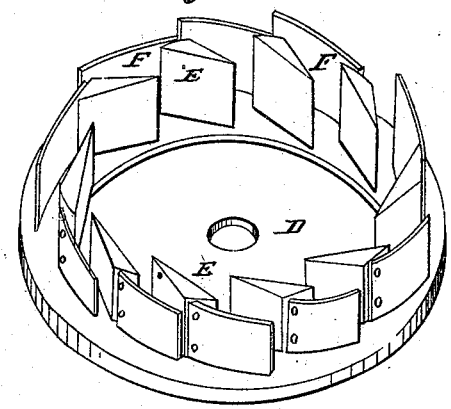
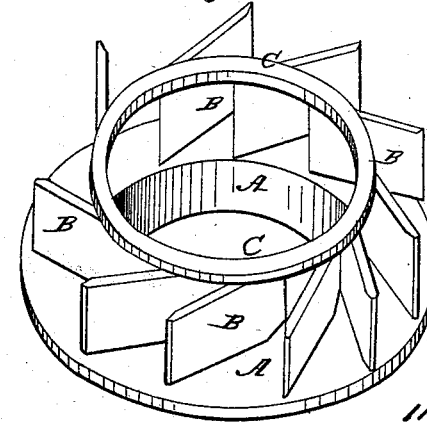

UNITED STATES PATENT OFFICE.

JAMES D. BRYSON AND JOHN H. HARTSUFF, OF NEWCASTLE, PA.

IMPROVED CURB FOR WATER-WHEELS.

Specification forming part of Letters Patent No. 81,474, dated August 25, 1868.

*To all whom it may concern:*

Be it known that we, JAMES D. BRYSON and JOHN H. HARTSUFF, of Newcastle, in the county of Lawrence, and in the State of Pennsylvania, have invented certain new and useful Improvements in Water-Wheels; and do hereby declare that the following is a full, clear, and exact description thereof, reference being had to the accompanying drawings, and to the letters of reference marked thereon.

The nature of our invention consists in providing the upper casing of a water-wheel with gates and sliding plates, to regulate the flow of water between the chutes on the lower casing, said chutes being connected at their inner corners by a band or ring, on which the upper casing rests and revolves.

In order to enable others skilled in the art to make and use our invention, we will now proceed to describe its construction and operation, referring to the annexed drawings, which form a part of this specification, and in which—

Figure 1 is a longitudinal section; Fig. 2, a perspective of one chute with its gate and sliding plate. Fig. 3 is a perspective of the upper casing turned bottom side up, and Fig. 4 is a perspective of the lower casing.

A represents the lower casing of a water-wheel, and consists merely of a rim-wheel, on which a series of chutes, B B, is placed tangentially toward the shaft of the wheel, which shaft passes through its center. These chutes are connected on their upper side by means of a band or ring, C, which is placed over their inner ends, as shown in Fig. 4. This band or ring C fits into a corresponding groove or recess on the inside of the upper casing D, so that this casing rests thereon, this band thus forming a bearing on which the said upper casing can be moved or revolved. The lower side of the upper casing D is provided with a series of gates, E E, which are firmly secured to it outside of the groove in which the band C is placed, and are of the same number as the chutes on the lower casing, giving one gate to each chute; but these gates do not extend as far out as the chutes, being only about half the length.

On the ends of the said gates curved plates F F are loosely attached, which plates, when the casings are put together, close the space between the end of the gate and its corresponding chute, allowing the water ingress only in rear of each gate. These plates being loosely attached to the ends of said gates, when the upper casing, with the gates, is moved, they (the plates) will slide on the chutes, always closing the said space, in whatever position the gates may be. It will thus be seen that by simply turning the upper casing D on the band C, the gates E E and plates F F will regulate—that is, increase or diminish—the flow of water to the wheel in rear of each gate.

Having thus fully described our invention, what we claim as new, and desire to secure by Letters Patent, is—

The curved plates F F, loosely attached to the ends of the gates E E, and sliding on the chutes B B, all operating substantially as and for the purposes herein set forth.

In testimony that we claim the foregoing we have hereunto set our hands this 16th day of April, 1868.

JAS. D. BRYSON.
J. H. HARTSUFF.

Witnesses:
J. M. CRAIG,
ALBERT G. COX.